US006974351B1

(12) United States Patent
Lauk et al.

(10) Patent No.: US 6,974,351 B1
(45) Date of Patent: Dec. 13, 2005

(54) INTERCHANGEABLE ADAPTER FOR ELECTRIC MOTOR-AND-GEAR ASSEMBLY

(75) Inventors: Detlef Lauk, Renchen (DE); Ernst Fischer, Gernsbach (DE); Hansjoerg Karcher, Buehlertal (DE); Juergen Herp, Buehl (DE); Erik Maurer, Buehlertal (DE); Andreas Wiegert, Kappelrodeck (DE); Bernd Bock, Buehlertal (DE); Richard Hurst, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/743,960

(22) PCT Filed: May 17, 2000

(86) PCT No.: PCT/DE00/01586

§ 371 (c)(1),
(2), (4) Date: May 11, 2001

(87) PCT Pub. No.: WO00/72425

PCT Pub. Date: Nov. 30, 2000

(30) Foreign Application Priority Data

May 21, 1999 (DE) ................................ 199 23 298

(51) Int. Cl.[7] .............................................. H01R 25/00
(52) U.S. Cl. ....................................... 439/651; 439/655
(58) Field of Search ................................ 439/638, 650, 439/651, 655; 310/71

(56) References Cited

U.S. PATENT DOCUMENTS 4,239,319 A * 12/1980 Gladd et al. ................ 439/620
4,306,158 A * 12/1981 Ogle ......................... 307/10.8
4,331,122 A * 5/1982 Sohner et al. .............. 123/595
4,466,686 A * 8/1984 Houser ....................... 439/568
4,736,177 A * 4/1988 Vollmer et al. ............. 335/299
4,830,621 A * 5/1989 Maue et al. .................. 439/52
4,917,625 A * 4/1990 Haile ......................... 439/358
5,192,231 A * 3/1993 Dolin, Jr. .................... 439/620
5,341,812 A * 8/1994 Allaire et al. ............... 600/508
5,528,093 A * 6/1996 Adam et al. .................. 310/89
5,594,276 A * 1/1997 Murari et al. ............... 257/693
5,885,102 A * 3/1999 Harting et al. .............. 439/527
6,022,189 A * 2/2000 Yu ................................ 416/5
6,203,293 B1 * 3/2001 Yamamoto et al. ...... 417/423.1

FOREIGN PATENT DOCUMENTS

DE 197 55 337 A1 6/1998
EP 0 655 822 A1 5/1995
EP 0 868 008 A1 9/1998
JP 10225048 8/1996
WO WO 98/13925 4/1998

* cited by examiner

*Primary Examiner*—Neil Abrams
(74) *Attorney, Agent, or Firm*—Ronald E. Greigg

(57) ABSTRACT

In an electric motor-and-gear assembly for driving automotive power accessories such as front and rear wipers, power window units, or the like, having transmission casing, that can be closed by means of a casing cover, and having a socket that is disposed in the casing cover and can be contacted by means of a connector plug in order to connect the electric motor to the electrical system of the vehicle, for the sake of a uniform, single design of the socket when there are structurally varied designs of connector plugs, the socket is attached to an interchangeable adapter which has a first group of electrical contacts adapted to the socket and a second group of electrical contacts adapted to the connector plug. The contacts of the two contact groups, which are comprised of plug tabs, are connected to one another in an electrically conductive manner inside or along a surface of the adapter.

4 Claims, 3 Drawing Sheets

INTERCHANGEABLE ADAPTER FOR ELECTRIC MOTOR-AND-GEAR ASSEMBLY

CROSS-REFERENCE TO RELATED APPLICATIONS

This application is a 35 USC 371 application of PCT/DE 00/01586 filed on May 17, 2000.

BACKGROUND OF THE INVENTION

1. Field of the Invention

The invention an improved electric motor, and more particularly an electric motor-and-gear assembly for driving automotive power accessories such as front and rear wipers, power window units, or the like.

2. Description of the Prior Art

In an electric motor-and-gear assembly of the type with which this invention is concerned and employing a commutator motor with the commutator and commutator brushes disposed in the transmission casing and thereby to embody the socket on the transmission casing cover is disclosed in DE 198 58 233.1. The socket is constituted by pins which are disposed in a pocket protruding tangentially from the assembly cover. The connector plug to the electrical system of the vehicle is slid into the pocket, wherein its plug contacts, embodied as plug sleeves or bushings, are slid in a properly functioning manner onto the pins of the socket.

Since the different vehicle manufacturers predetermine different designs and plug positions of the connector plug to the electrical system of the vehicle, the supplier of the motor-and-gear assembly is required to design, manufacture, and store transmission casing covers that are adapted specifically to these connector plugs so that the motor-and- gear assembly can be connected to a particular transmission casing cover for each vehicle manufacturer.

SUMMARY OF THE INVENTION

The electric motor according to the present invention, in particular an electric motor-and-gear assembly for driving automotive power accessories, has the advantage of a simplified and inexpensive manufacture since as a result of the adapter which is adapted to the connector plug to the electrical system of the vehicle, which is also referred to as the client plug, the casing cover with the socket can be uniformly embodied for all clients and only the small adapter part must be specifically manufactured for each client. This reduces the tool costs for the injection molding of the casing cover and permits the number of casing covers that can be manufactured with one tool to be considerably increased so that manufacturing costs decrease as production numbers increase. Moreover, the design cost is also reduced since designing the new adapter according to client specifications is less demanding than adapting the entire casing cover to client specifications. The functions of the connector plug in the casing cover, such as the parked position, interference suppression, contact position, and testing position when using the motor-and-gear assembly for driving windshield wipers can therefore have a uniform, single design.

BRIEF DESCRIPTION OF THE DRAWINGS

Other features and advantages of the invention will became apparent from the detailed description contained herein below, taken in conjunction with the drawings, in which.

DESCRIPTION OF THE PREFERRED EMBODIMENTS

Figure 1:
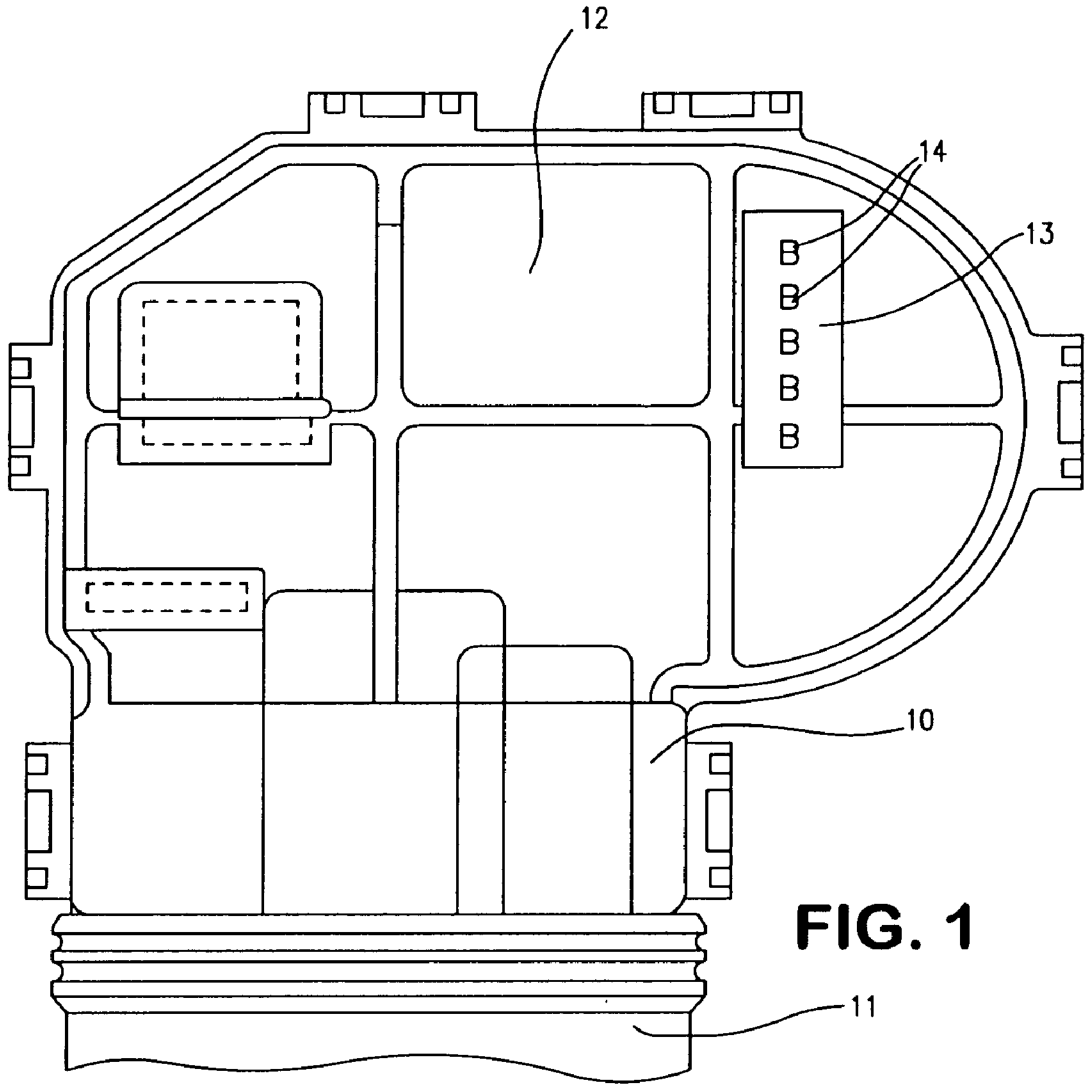
FIG. 1 shows a detailed top view of an electric motor-and-gear assembly with a uniform socket.

The electric motor-and-gear assembly, a detailed top view of which is shown in FIG. 1 as an example for a common electric motor, is used for example to drive a windshield wiper of a motor vehicle. It has a transmission casing 10 and a motor casing 11 attached to it. The transmission casing 10, which contains a transmission that is not shown here, has a mounting opening that is closed by a casing cover 12, wherein a seal (not shown) is inserted between the casing cover 12 and the transmission casing 10 to produce a dust and moisture seal. The motor casing 11 contains the electric motor, which is embodied for example as a commutator motor, whose rotor shaft supporting the commutator protrudes into the transmission casing. Correspondingly, the commutator brushes cooperating with the commutator are disposed in the transmission casing 10 and a socket 13 for supplying power to the commutator motor and controlling it is disposed in the casing cover 12. The motor-and-gear assembly is connected to the electrical system of the vehicle by means of a connector plug (not shown here), which contacts the socket 13. The socket 13 has a single design and is provided with uniform electrical functions such as a parked position, interference suppression, uniform contact position, and testing position. In the exemplary embodiment, the socket 13 has a total of five connection contacts which are embodied as a plug bushings or a plug sleeves 14 and are incorporated directly into the casing cover 12, preferably during the injection molding of the casing cover 12 and are molded in place with plastic. The plug sleeves 14 are contacted by a pressed screen, individual strip conductors, or a printed circuit board on the inside of the casing cover 12.

Figure 2:
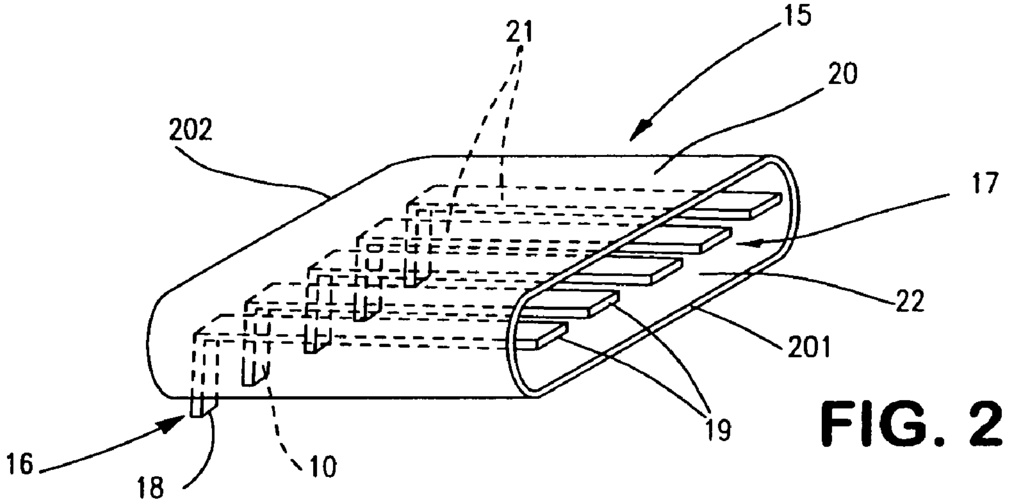
FIG. 2 is a perspective view of an adapter for plugging into the uniform socket in FIG. 1.

In order to make the motor-and-gear assembly compatible with variously designed connector plugs from different vehicle manufacturers, and to avoid an adaptation of the socket 13 to the different connector plugs and thereby to prevent constant structural alterations to the casing cover 12, an adapter 15 is kept on hand, which is shown in a perspective depiction in FIG. 2, which has a first group 16 of electrical contacts adapted to the socket 13 and a second group 17 of electrical contacts adapted to the connector plugs predetermined by the vehicle manufacturer. Inside the adapter 15, the contacts of the two contact groups 16, 17 are connected to each other in an electrically conductive manner. The adapter 15 has an adapter body 20, whose cross section corresponds to a flattened oval whose longitudinal sides are parallel to each other. A cavity-shaped recess 22 is let into the one end 201 of the adapter body 20. The contacts of the two contact groups 16, 17 are respectively embodied as flat plug tabs 18, 19, wherein in the vicinity of the end 202 remote from the recess 22, the plug tabs 18 of the first contact group 16 protrude from the bottom longitudinal side of the adapter body 20 and inside the recess 22 of the adapter body 15, the plug tabs 19 of the second contact group 17 protrude axially from the bottom of the recess 22 and can be freely accessed inside the recess 22. The plug tabs 18, 19 are dimensioned and disposed so that the plug tabs 18 can be slid in a positively engaging manner into the plug sleeves 14 of the socket 13 and the plug tabs 19 can be slid in a positively engaging manner into corresponding plug bushings of the client-specific connector plug. As indicated with dashed lines in FIG. 2, the plug tabs 18 are electrically connected to the plug tabs 19 by means of strips or struts 21 whose ends are formed onto the plug tabs 18 and 19 and are of one piece with them. The struts 21 are fixed in the adapter body 20 in axially parallel alignment, with a definite distance from one another.

Figure 3:
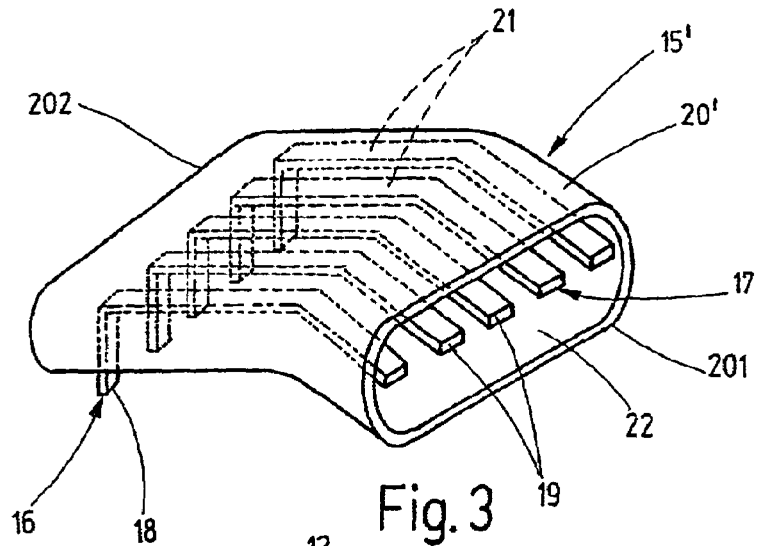
FIG. 3 is a view similar to FIG. 2 of an adapter according to another exemplary embodiment.

FIG. 3 shows another exemplary embodiment of an adapter 15' which fulfills the client requirement for a particular spatial alignment of the client-specific connector plug in relation to the motor-and-gear assembly. The adapter 15', which is designed with an angled adapter body 20', and shown in perspective, which also shows the open end 201 with the plug tabs 19 disposed in the recess 22 and the plug tabs 18 protruding downward at right angles from the other end 202 of the adapter body 20'.

Figure 4:
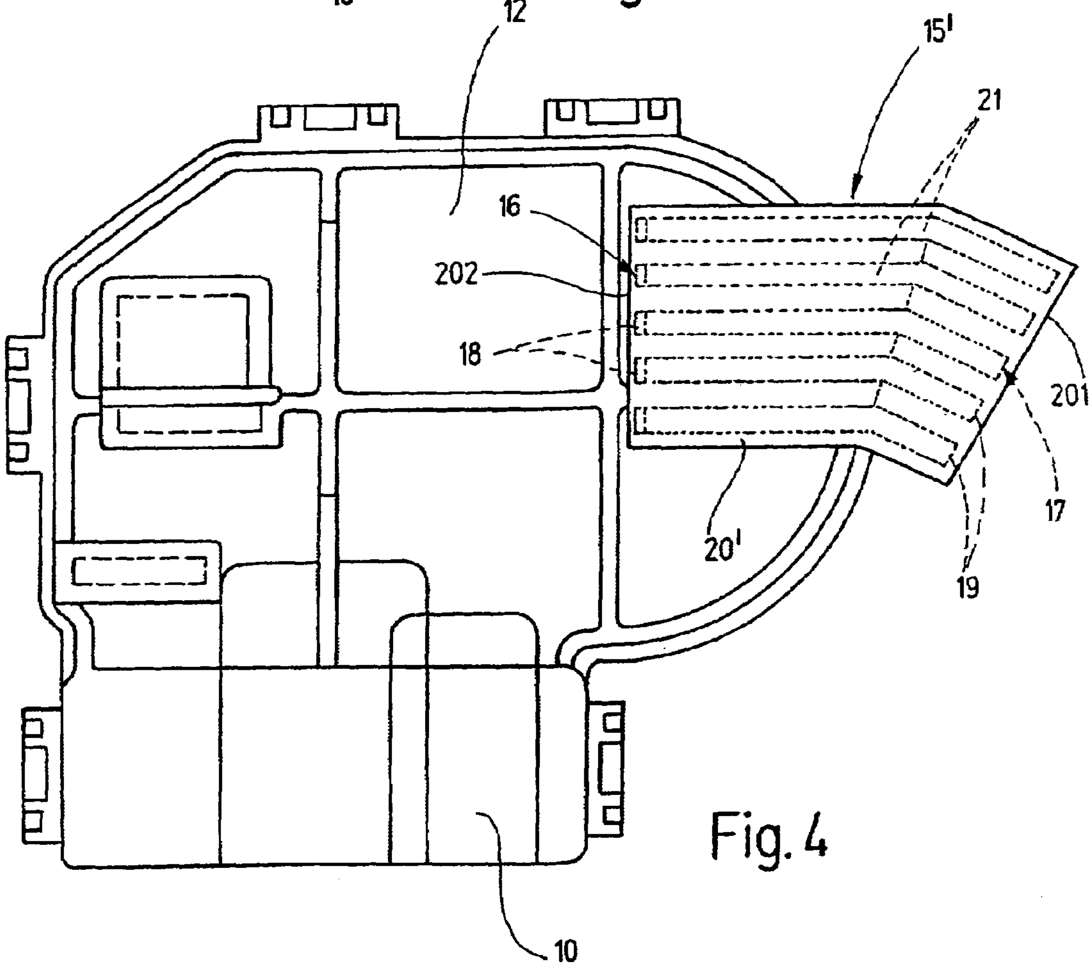
FIG. 4 is a top view of the transmission casing of the motor-and-gear assembly in FIG. 1, with an adapter plugged into the uniform socket according to FIG. 3.

FIG. 4 shows the transmission casing 10 of the motor-and-gear assembly according to FIG. 1, wherein the adapter 15' according to FIG. 4 is plugged into the uniform socket 13 in the transmission casing cover 12, so that the plug tabs 18 protruding from the bottom of the adapter body 20' are slid into the plug sleeves 14 of the uniform socket 13. The plug tabs 19 accessible at the one end 201 of the adapter body 20' meanwhile have not yet been connected to the client-specific connector plug which must now be slid into the recess 22 provided on the end 201.

Figure 5:
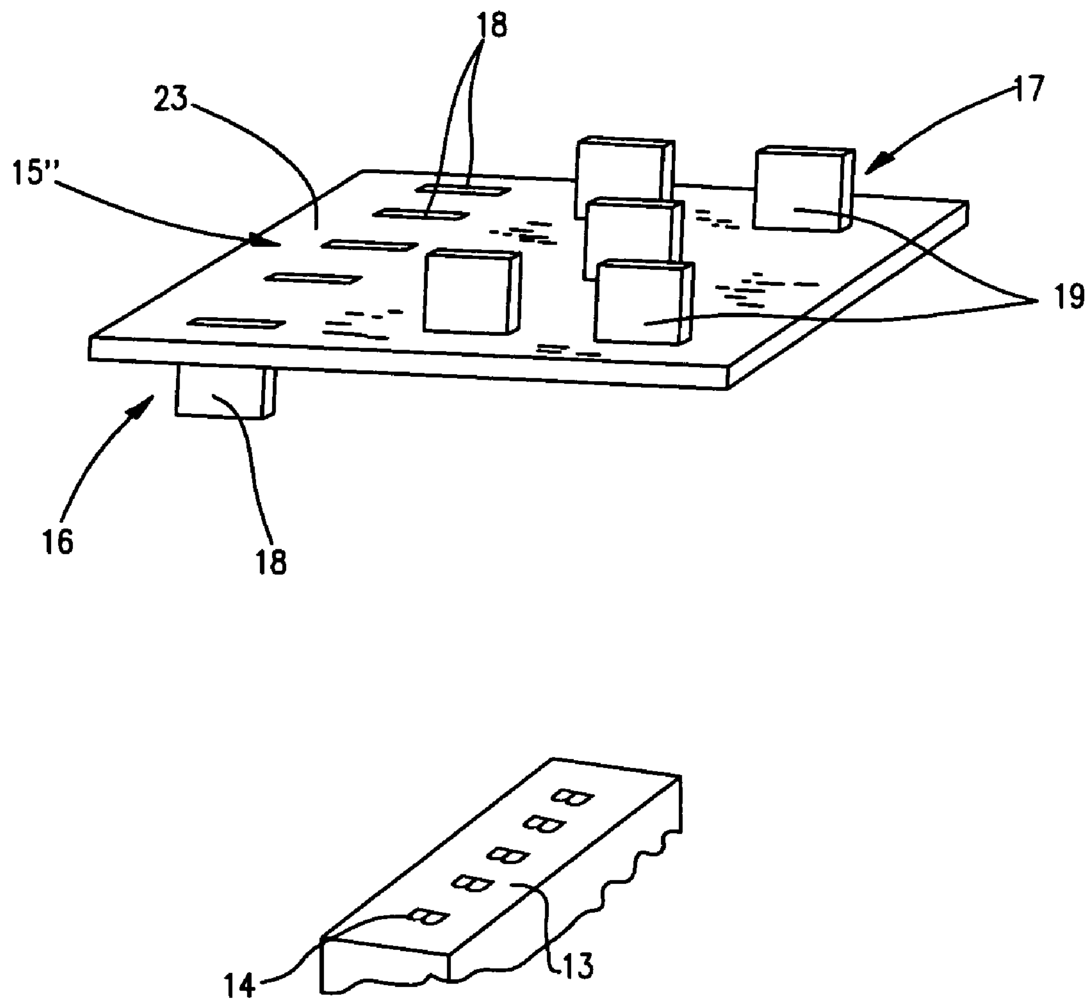
FIG. 5 is a view similar to FIG. 2, of a third exemplary embodiment.

In an alternative embodiment shown in FIG. 5, the adapter 15" is embodied as a flat plastic plate 23 and the contacts of the two contact groups 16, 17 are comprised of plug tabs 18, 19 affixed in the plastic plate 23, wherein the plug tabs 18 of the first contact group 16 protrude at right angles from one side of the plastic plate 23, in this instance the bottom, and the plug tabs 19 of the second contact group 17 protrude at right angles from the other side of the plastic plate 23, in this instance the top. The plug tabs 18, 19 pass through to the other side of the plastic plate 23 and are dimensioned and disposed so that the plug tabs 18 can be slid in a positively engaging manner into the plug sleeves 14 of the socket 13 and the plug tabs 19 can be slid in a positively engaging manner into corresponding plug bushings of the client-specific connector plug. The plug tabs 18 are electrically connected to the plug tabs 19 on the underside of the plastic plate 23 from which the plug tabs 18 protrude. The electrical connections are embodied as strip conductors, which contact the ends of the plug tabs 18 and the ends of the plug tabs 19 which pass through to the underside of the plastic plate 23.

The foregoing relates to preferred exemplary embodiments of the invention, it being understood that other variants and embodiments thereof are possible within the spirit and scope of the invention, the latter being defined by the appended claims.

What is claimed is:

1. An electric motor-and-gear assembly for driving automotive power accessories such as front and rear wipers, power window units, or the like, said assembly having a transmission casing (10) closed by means of a casing cover (12), and having a socket (13) that is disposed in the casing cover (12) and adapted to be contacted by means of a connector plug in order to connect the electric motor to the electrical system of the vehicle, and an interchangeable adapter (15; 15'; 15") attached to said socket (13), said adapter having a first group (16) of electrical contacts adapted to the socket (13) and a second group (17) of electrical contacts adapted to the connector plug, said contacts of the two contact groups (16, 17) being connected to one another in an electrically conductive manner inside the adapter (15; 15'; 15"), wherein the contacts of the two contact groups (16, 17) of the adapter (15; 15', 15") are comprised of plug tabs (18, 19) of which the one group of plug tabs (18) are embodied so that they can be slid in a positively engaging fashion into the socket (13) and the other plug tabs (19) are embodied so that they can be slid in a positively engaging fashion into plug sleeves of a connector plug, and wherein the electrical connection between the plug tabs (18, 19) is produced by means of strips or struts (21) disposed in the adapter body (20; 20') whose ends have the plug tabs (18, 19) formed onto them and of one piece with them, wherein the adapter (15; 15') has an adapter body (20; 20') a first end (201) with a recess (22) formed therein in which the plug tabs (19) of one contact group (17) are disposed and can be accessed and that the plug tabs (18) of the other contact group (16) are at right angles to the direction of the plug tabs (19) of the one contact group (17).

2. The motor-and-gear assembly according to claim 1, wherein the socket (13) has plug sleeves (14).

3. The motor-and-gear assembly according to claim 2, wherein the plug sleeves (14) of the socket (13) are incorporated directly into the casing cover (12), preferably are cast into it.

4. An electric motor-and-gear assembly for driving automotive power accessories such as front and rear wipers, power window units, or the like, said assembly having a transmission casing (10) closed by means of a casing cover (12), and having a socket (13) that is disposed in the casing cover (12) and adapted to be contacted by means of a connector plug in order to connect the electric motor to the electrical system of the vehicle, and an interchangeable adapter (15") attached to said socket (13), said adapter having a first group (16) of electrical contacts adapted to the socket (13) and a second group (17) of electrical contacts adapted to the connector plug, said contacts of the two contact groups (16, 17) being connected to one another in an electrically conductive manner inside the adapter (15"), wherein the contacts of the two contact groups (16, 17) of the adapter (15") are comprised of plug tabs (18, 19) of which the one group of plug tabs (18) are embodied so that they can be slid in a positively engaging fashion into the socket (13) and the other plug tabs (19) are embodied so that they can be slid in a positively engaging fashion into plug sleeves of a connector plug, and wherein the adapter (15") is embodied as a flat plastic plate (23) and the plug tabs (18) of the one contact group (16) protrude from one side of the plastic plate (23) and the plug tabs (19) of the other contact group (17) protrude from the other side of the plastic plate (23).

* * * * *